April 23, 1963 F. C. GOLDSMITH 3,086,849
APPARATUS FOR CARRYING OUT CHEMICAL PROCESS
Original Filed Dec. 20, 1951 3 Sheets-Sheet 1

INVENTOR.
FRED CORWIN GOLDSMITH
BY
Oberlin & Limbach
ATTORNEYS.

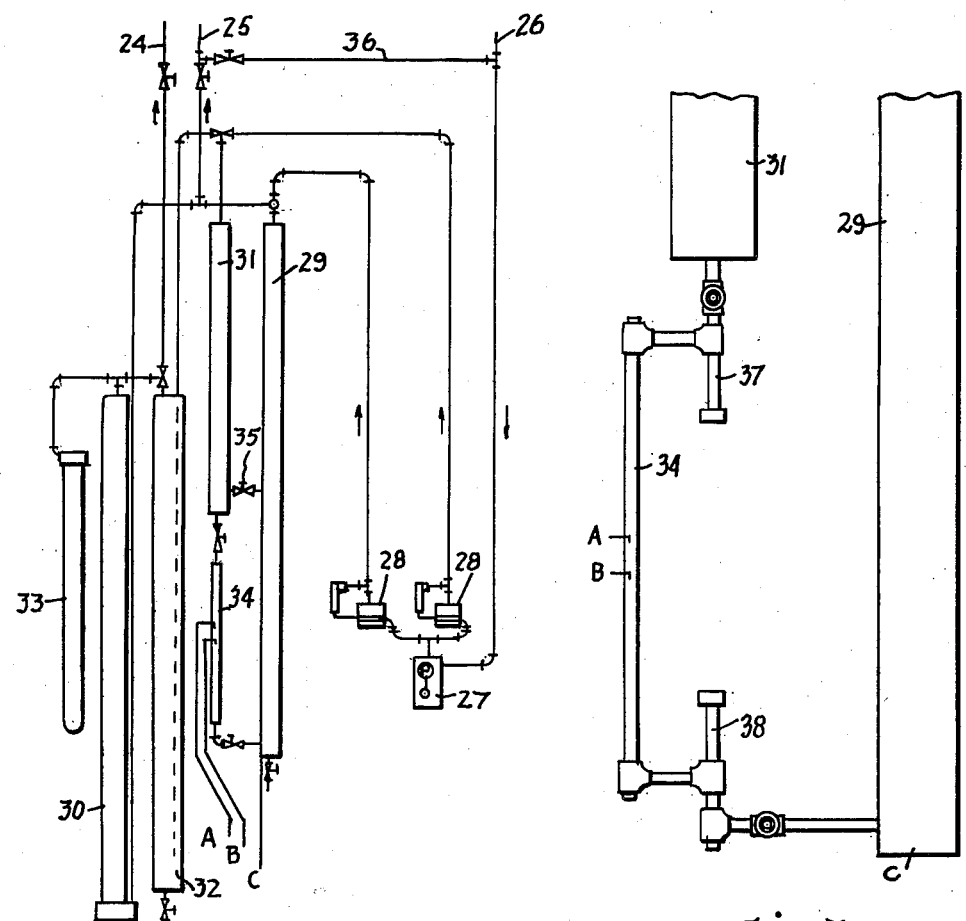

April 23, 1963  F. C. GOLDSMITH  3,086,849
APPARATUS FOR CARRYING OUT CHEMICAL PROCESS
Original Filed Dec. 20, 1951  3 Sheets-Sheet 3

INVENTOR.
FRED CORWIN GOLDSMITH.
BY
Oberlin Limbach
ATTORNEYS.

United States Patent Office 3,086,849
Patented Apr. 23, 1963

3,086,849
APPARATUS FOR CARRYING OUT CHEMICAL
PROCESS
Fred Corwin Goldsmith, Cleveland, Ohio, assignor to The
Lubrizol Corporation, Wickliffe, Ohio, a corporation of
Ohio
Original application Dec. 20, 1951, Ser. No. 262,600, now
Patent No. 2,862,947, dated Dec. 2, 1958. Divided
and this application Aug. 28, 1957, Ser. No. 680,882
4 Claims. (Cl. 23—260)

This invention relates as indicated to a process and apparatus for reacting a plurality of reagents, at least one of which is a fluid, and more specifically a liquid, and at least one of which is a solid, and more particularly wherein the specific gravities of said fluid and solid reagents are substantially different. This is a divisional application of co-pending application Serial No. 262,600, filed December 20, 1951, and now U. S. 2,862,947.

By the present invention, the reaction is carried out with the reagents in the form of a slurry which is continuously circulated. By continuous or intermittent replenishment of the reagents taken up by the reaction and preferably also by the continuous or intermittent withdrawal of the products formed, the process may be made fully continuous.

The process and apparatus of this invention are adapted for use with both endothermic and exothermic reactions since it is relatively easy to effect the necessary temperature control as by heating or cooling of the reaction mass as it is circulated.

As indicated, the invention is particularly adapted for use in effective reactions wherein the reagents have measurable differences in specific gravity and especially in connection with reactions which permit the presence in the reaction mass of substantial excesses of one of the reagents since by maintaining those conditions it has been found possible to control the rate of replenishment of the reagents by simple means such as density responsive equipment.

More particularly, the invention is applicable to reactions such as those wherein a solid such as phosphorus sulfide is reacted with an organic hydroxy compound such as an alcohol in the production of dithiophosphoric acid esters.

It is therefore a principal object of my invention to provide a process and apparatus by which reactions of the character defined may be carried out expeditiously, at low cost and by the use of simple equipment which may be readily controlled.

Other objects of the invention will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 2 is a diagrammatic showing of one type densometer, or density control device, which may be used in applicant's apparatus;

FIG. 3 is a detailed showing of the glass tube 34 in FIG. 2; and

Broadly stated, this invention comprises the provision of apparatus capable of performing the process of this invention which process may be broadly defined as the process of reacting solid and liquid reagents to form a liquid product, the steps of continuously circulating in a closed system a slurry of at least one solid reagent, the major portion of the liquid phase of said slurry being inert to the desired reaction, introducing into said closed system at least one reagent at rates so as to maintain said solid reagent at every point in said system in amounts greatly in excess of the minimum amounts required for complete reaction with the amount of liquid reagent present at that point, maintaining the temperature of the continuously circulating stream of slurry for a substantial portion of its circulating cycle at a temperature favorable to the desired reaction, and drawing off from the system liquid product at about its rate of formation.

Figure 1:
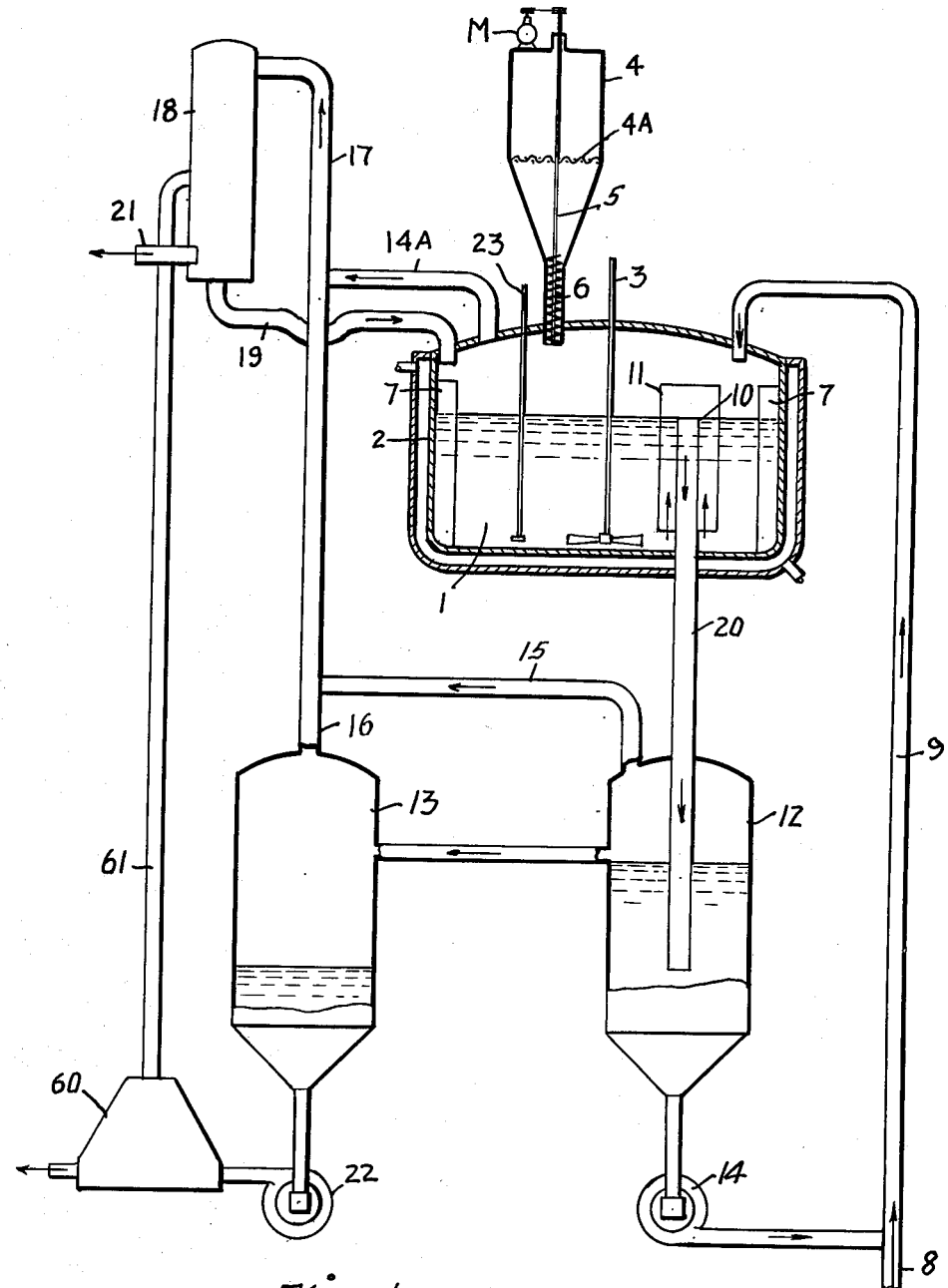
FIG. 1 is a generally diagrammatic showing of the preferred form of applicant's invention.

Referring now more particularly to the preferred form of my invention in FIG. 1, one hundred gallons of slurry 1, comprising solid reagents suspended in a mixture of a small proportion of liquid reagent and a relatively large proportion of the diluent, which can be an inert material or preferably the liquid product of the reaction of the solid reagent with the liquid reagent, is maintained at uniform temperature in reactor 2. The solid reagents form the solid phase and the diluent the liquid phase of the slurry. The slurry is agitated in the kettle by stirrer 3 and vanes 7 attached to the wall of the kettle. Powdered solid reagent is loaded into feed hopper 4 located above reactor 2. The solid reagent is continuously fed into the reactor 2 from hopper 4 by means of a revolving vertical screw 5 extending into the top of the reactor. The screw 5 fits the barrel 6 of the hopper 4 closely and provides gas-tight seal between hopper 4 and kettle 2. Liquid reagent is continuously fed into the slurry by line 8 connected to line 9, or if desired by a line connected into the top of reactor 2. The liquid reagent and solid reagent react in reactor 2, forming a liquid product and liberating a gas. A vertical weir 10 is provided in reactor 2. A baffle 11 is spaced from weir 10 and provides a quiescent zone around the weir 10. A portion of the slurry in the reactor overflows continuously weir 10 and flows down line 20 into solids separator 12 located below the reactor. The decanted liquid phase of the slurry, essentially free of solid reagent, overflows the side of separator 12, into the receiver 13. The solid reagent enriched separator slurry stream is fed to a pump 14 and returned to the reactor 2 by line 9. The liquid phase of the slurry is pumped from the receiver 13 by pump 22 to suitable storage tanks, not shown. If the diluent is a material other than the reaction product of the solid and liquid reagents, further steps will have to be taken to separate the diluent and product. For this purpose a flash evaporator 60 can be employed to evaporate the diluent and conduct the diluent vapor by line 61 to cooler 18 where the diluent is condensed and returned to the slurry by line 19. Thus, it is desirable for most purposes to use where possible the reaction product as the diluent.

The by-product gas atmospheres in the reactor 2, separator 12, and receiver 13 are collected in lines 14A, 15, 16, respectively, connected to common line 17. The by-product gas liberated is normally saturated with evaporated liquid reagent. The gas stream is passed by common line 17 to gas cooler 18, and the liquid reagent condensate is run back into reactor 2 by line 19. The cooled gas then passes to an absorber by line 21, not shown, or is disposed of in some other way.

The density of the slurry 1 in reactor 2 is determined continuously by two nitrogen probes in the reactor 2, referred to generally in FIGURE 1 by reference 23. Referring now to the densometer, in FIG. 2, an upper probe 24 vents to the gas space in the reactor 2 and measures the gas pressure above the slurry 1. The lower probe 25 extends near the bottom of the reactor 2 and measures the weight of the slurry above the lower probe to the height of weir 10 in FIGURE 1, the weir 10 being a means for providing a constant height of slurry. The difference between the two pressures provides a means for measuring the average slurry density. The specific gravity of the solid reagent is substantially different from the liquid phase of the slurry so that, as the concentration of solid reagent in the slurry increases, the density increases; and as the concentration of solid reagent in the slurry decreases, the density decreases. Thus, the measured density provides a means for controlling the feed ratios of the reagents. The liquid reagent feed may be kept constant and the solid reagent feed varied, or the solid reagent feed may be held constant and the liquid reagent feed varied. The first method is used in this unit, but the latter method may be used equally well. The upper nitrogen probe 24 and the lower nitrogen probe 25 are supplied with nitrogen from a supply line 26 at a pressure of about 15 pounds per square inch gauge. The nitrogen gas flows through a surge chamber 27 where any foreign particles drop out. From the surge chamber the nitrogen flows through flow regulators 28 which regulate the flow to the system probe tubes at a constant rate of one cubic foot per hour. On the lower probe side, the flow goes to the lower probe equilibrium chamber 29, the densometer manometer 30, and to lower probe 25 in the reactor 2. On the upper probe side, the flow goes to the upper probe equilibrium chamber 31, and to an oil equalizing tank 32 through which the pressure drops; this drop being roughly equivalent to the pressure drop of the lower probe in reactor 2. The nitrogen outlet from the oil equalizing tank goes to the top of densometer manometer 30, to the system pressure manometer 33, and to upper probe 24. The system pressure manometer 33 indicates the gas pressure within the system. The densometer manometer 30 indicates the difference between the pressure on the lower probe 25 and the gas pressure in the system. This reading is a direct reading of the density of the material in the reactor 2 at the operating conditions, since the level of the material in the reactor 2 is kept constant by overflow weir 10. The function of the oil equalizing tank 32 is to decrease this differential reading under normal operating conditions to approximately zero between the upper and lower probe equilibrium chambers 29, 31. A differential manometer is used to magnify the density changes in the reactor 2. This is done by using a small diameter glass tube 34 connected between the bottom of the upper probe equilibrium chamber 31 and the bottom of lower probe equilibrium chamber 29. Manometer fluids of kerosene and a 4% dichromate solution are used. Since the glass tube diameter is smaller than the diameter of equilibrium chambers 29, 31, the movement of liquid in the chamber to cause a 2 inch or 3 inch movement in the glass tube is negligible. The dichromate-kerosene interface is adjusted to the midpoint of the glass tube 34 and gives a magnification of:

$$\frac{1}{d(\text{dich.}) - d(\text{kero.})} = \frac{1}{1.0 - 0.8} = 5$$

where $d(\text{dich.})$ and $d(\text{kero.})$ represent the density of the dichromate solution and kerosene, respectively. Or, if the reading on the densometer manometer 30 varies one inch, the reading on the glass contact tube will vary five inches. By inserting two platinum contact electrodes, two inches apart in the glass tube, the densometer manometer 30 can be controlled to 0.4 inch water column reading difference.

The densometer equilibrium valve 35 regulates the density range. The density of the slurry is allowed to build up with the valve open; upon closing the valve 35, the glass contact tube 34 takes over and controls the density. If a higher or lower value of density is desired, the valve 35 is opened and the density adjusted by feeding alcohol with the solid reagent feed off to lower density, or feeding solid reagent with alcohol feed decreased to raise the density. At the desired density, valve 35 is closed. This completes the density control adjustment.

A nitrogen purge line 36 to lower probe 25 is shown at the top of the drawing. To free a plugged lower probe 25, the purge valve 25 would be opened.

Figure 4:
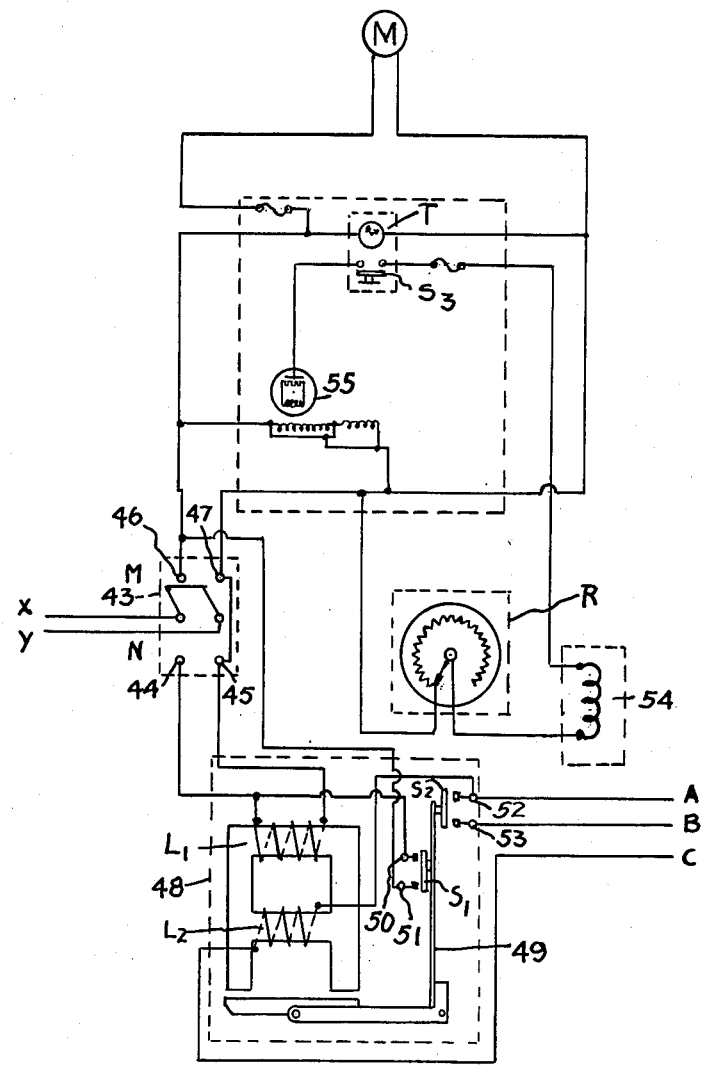
FIG. 4 is the electrical circuit of the control device which may be used in applicant's apparatus.

Referring now to FIGURES 3 and 4, the glass contact tube 34 is provided with a trap 37 to remove foreign particles from the kerosene and a trap 38 to remove particles from the dichromate solution. Three wires A, B, C lead from the glass contact tube 34 to the electrical control device. The A and B contacts are limit controls connected to two platinum contact electrodes spaces two inches apart in glass tube 34. The C contact is a common ground. The A contact, or upper contact, shuts off the solid reagent feed when the circuit of A to C through dichromate is completed. When the solid reagent feed stops, the density begins to fall due to constant alcohol feed. As the interface of dichromate solution begins to descend from A to B, the initial circuit A to C is maintained by a holding circuit in the controller. This condition continues until the interface falls below B probe contact and breaks the holding circuit in the electrical control device, and also completes the circuit to the feed screw to start feeding of solid reagent again into reactor 2.

On FIGURE 4, lines X, Y are an A.C. supply. Switch 43 is a double pole double throw type to switch the solid reagent feed from automatic to manual control, indicated by letters N and M. When the switch is in the manual position M, the A.C. supply X, Y is connected to terminals 46, 47. In the automatic position N, the A.C. supply X, Y is connected to terminals 44, 45. A jumper connects terminals 45, 47. The following discussion will assume switch 43 is in automatic position, N. Current is supplied to the primary coil $L_1$ of relay 48. Coil $L_2$ is a secondary coil energized by $L_1$ when its circuit is closed. An A-shaped iron core is provided for $L_1$, $L_2$. Two switches $S_1$, $S_2$ are mounted on movable arm 49. Coil $L_1$ is always energized and tends to move arm 49 to close switch $S_1$ and terminals 50, 51. Coil $L_2$ when energized, bucks the electromagnetic force of coil $L_1$ to move arm 49 to close switch $S_2$ and terminals 52, 53, and also to open $S_1$ and terminals 50, 51. To illustrate a typical cycle of operation, as the density increases and the dichromate solution rises in glass tube 34, it first contacts B. Nothing happens because the holding switch $S_2$ is open at 52, 53 and $L_1$ normally holds $S_1$ closed. When the dichromate solution rises to A, the circuit of secondary coil $L_2$ is closed through the liquid A to C, which causes a bucking action to take place in the core of secondary coil $L_2$, closing switch $S_2$ and opening switch $S_1$. The armature 49 is held in this position by the holding circuit B to C through $S_2$ keeping $L_2$ energized until the dichromate solution drops below B. As the density decreases in the reactor and the dichromate solution drops below contact B, the circuit B to C is broken at which time $S_1$ is closed by $L_2$ to operate motor M and feed the solid reagent to the reactor and again increase the density until the dichromate solution in glass tube 34 again rises to contact A and $S_1$ is opened. It will be noted that the switch $S_1$ operates motor M which drives the feed screw 5 in hopper 4 feeding solid reagent into reactor 2. The hopper 4 is provided with a vibrator 54 to aid the flow of solid reagent. The direct current necessary for operation of the vibrator is supplied by rectifier tube 55 which must be energized before use. This is accomplished by means of a time delay clock relay T which closes switch $S_3$ and the vibrator circuit only after the rectifier has reached operating conditions. A rheostat R is provided to control operation of vibrator 54.

It is to be understood that although an electrical control device has been described above which controls the rate of solid reagent feed while a constant rate of feed of liquid reagent is maintained, other systems may be employed equally well. Pneumatic and hydraulic control systems are generally equivalent to electrical systems and may be employed, for instance, to vary the liquid reagent feed while the solid reagent is kept constant.

The solid reagent should have a specific gravity that is substantially different from the liquid phase of the slurry. In the process and apparatus of this invention it is desirable to employ a solid reagent with a specific gravity substantially greater than the specific gravity of the liquid phase of the slurry.

The solid reagent employed should be in a finely divided state, and it is preferable to use a solid reagent which will pass through a No. 20 U.S. standard screen.

In the preparation of organic dithiophosphate materials the solid reagent can be compounds of phosphorus and sulfur, for example:

Phosphorus disulfide—$P_3S_6(PS_2)$
Phosphorus trisulfide—$P_4S_6(P_2S_3)$
Phosphorus sesquisulfide—$P_4S_3$
Phosphorus pentasulfide—$P_2S_5(P_4S_{10})$
Phosphorus heptasulfide—$P_4S_7$ For many purposes, phosphorus pentasulfide will be found especially useful as a solid reagent.

The liquid reagent can be an organic hydroxy-containing body, for example monohydric and dihydric alcohols, cycloaliphatic mono-hydric alcohols, aliphatic di-hydric alcohols, cycloaliphatic di-hydric alcohols, polyhydric alcohols, and phenolic compounds.

If the alcohol is a solid it can be dissolved in a solvent and in that manner be employed as a liquid reagent in the process.

The following table summarizes typical operating conditions in the process and apparatus described above for the preparation of organic dithiophosphate materials by the reaction of $P_2S_5$ and alcohols.

*Type of Alcohol*

| Item | Condition | Methyl-iso-butyl carbinol | Iso-propyl alcohol | Blend [1] |
|---|---|---|---|---|
| A | Alcohol feed rate, lbs./hr. | 472 | 277 | 700 |
| B | $P_2S_5$ feed rate, lbs./hr. | 244 | 244 | 293 |
| C | Acid rate, lbs./hr. | 619 | 483 | 948 |
| D | $H_2S$ rate, lbs./hr. | 37 | 38 | 45 |
| E | Operating temp, °F. | 210 | 170 | 210 |
| F | Operating density | 0.955–0.972 | 1.040–1.058 | 0.918–0.936 |
| G | Percent $P_2S_5$ in slurry. | 6–8 | 6–8 | 6–8 |

[1] Blend—37.5% n-octyl alcohol, 37.5% methyl-iso-butyl carbinol, 25% n-hexyl alcohol.

To persons skilled in the art a description of the operation of the process and apparatus constituting the present invention will be found useful. In the preparation of organic dithiophosphate acid esters by the reaction of $P_2S_5$ and alcohols, the reaction can be illustrated by the following equation:

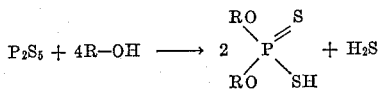

The liquid organic dithiophosphate acid ester is preferred as the diluent in this process. To operate the apparatus, the nitrogen probes 24, 25, are turned on and the densometer equilibrium valve 35 is opened. When the densometer valve 35 is opened and shutoff valves for the glass contact tube are opened, the dichromate-kerosene interface should ride between the platinum contacts A and B. If this is not the case an adjustment should be made by adding or removing the dichromate solution. The alcohol is fed into reactor 2 heated to reaction temperature (see item E in the table above). After the alcohol overflows weir 10, the alcohol is shut off. The $P_2S_5$ feed is begun (see item B in table above). When the densometer manometer indicates 90% of the desired density (see item F above) the alcohol feed is begun at one-half the normal feed rate (see item A above). The densometer valve 35 is closed at the desired density and switch 43 thrown to automatic position to automatically regulate the $P_2S_5$ feed rate. Over a four hour period the alcohol feed rate is gradually increased to normal. The slurry, comprising essentially organic dithiophosphate acid ester and $P_2S_5$, is continuously circulated from reactor 2, over weir 10, to separator 12, and then back to reactor 2 by pump 14 and line 9. When the density of the slurry increases in reactor 2 above a certain value, the automatic control shuts the $P_2S_5$ feed off until the density falls below a particular point, at which time the $P_2S_5$ feed is resumed automatically. The $P_2S_5$ is maintained at every point in the system in amounts greatly in excess of the minimum amounts required for complete reaction with the alcohol present at that point. Thus, the alcohol when introduced into the slurry reacts almost immediately with the $P_2S_5$ to insure accurate control of the rates of feed by the densometer. The organic dithiopnosphate acid ester is decanted essentially free of $P_2S_5$ from separator 12 to receiver 13. It has been found that it is equally satisfactory to vary the alcohol feed rate while maintaining constant the $P_2S_5$ feed rate.

Other modes of applying the principle of the invention may be employed, change being made as regards the details described, provided the features stated in any of the following claims, or the equivalent of such, be employed.

I therefore particularly point out and distinctly claim as my invention:

1. Apparatus for effecting reaction between the components of a reaction mass which produces a product of which the specific gravity is substantially different from that of at least one reactant material which comprises in combination a closed system in which the reaction mass may be circulated and means for effecting such circulation, said last named means including a vessel adapted to contain a body of the reaction mass, a weir in said first vessel over which flows by gravity that portion of the reaction mass which is caused to circulate in the system, a discharge outlet through which passes the overflow from said weir, a second vessel below said first vessel arranged to receive the flow of material from said first vessel, a draw-off weir in said second vessel, a conduit extending from said discharge outlet downwardly into communication with said second named vessel at a discharge point substantially below the level of said draw-off weir, and means to draw off material from the bottom of said second named vessel and introduce same into said first named vessel.

2. Apparatus for effecting reaction between the components of a reaction mass which produces a product having a specific gravity substantially different from that of at least one reaction component, which comprises in combination a first vessel adapted to contain a body of the reaction mass, a weir in said first vessel over which flows by gravity a portion of the reaction mass, a baffle extending downwardly around said weir so as to insure substantially vertical upward flow of the reaction mass in advance of said weir, a discharge outlet through which passes the overflow from said weir, a second vessel below said first vessel arranged to receive said overflow from said discharge outlet, a draw-off weir in said second vessel, a conduit extending from said discharge outlet downwardly into communication with said second vessel at a discharge point substantially below the level of said draw-off weir so as to insure substantial separation of said overflow material into portions of different specific gravity, and means to draw off material from the bottom of said second vessel and introduce the same into said first vessel.

3. The apparatus of claim 1 characterized further in that said first vessel is provided with means for recovering evaporated liquid reagent from a gaseous by-product.

4. The apparatus of claim 1 characterized further in that it is provided with means for drawing off a gaseous by-product from the space in the upper portion of said first vessel.

References Cited in the file of this patent

UNITED STATES PATENTS

| | | |
|---|---|---|
| 1,530,833 | Keeler | Mar. 24, 1925 |
| 1,748,619 | Romieux et al. | Feb. 25, 1930 |
| 2,160,177 | Shuman | May 30, 1930 |
| 2,332,527 | Pyzel | Oct. 26, 1943 |
| 2,430,228 | Kirkpatrick et al. | Nov. 4, 1947 |
| 2,471,115 | Mikeska | May 24, 1949 |
| 2,592,063 | Persyn | Apr. 8, 1952 |

OTHER REFERENCES

Scientific American, May 24, 1919, page 548.